United States Patent [19]
Smith

[11] 3,910,175
[45] Oct. 7, 1975

[54] DRY BLANCHING APPARATUS AND PROCESS

[75] Inventor: Traver J. Smith, San Jose, Calif.

[73] Assignees: Genevieve I. Hanscom; Robert Magnuson; Lois J. Thomson, all of San Jose, Calif. ; part interest to each

[22] Filed: Jan. 17, 1974

[21] Appl. No.: 433,994

Related U.S. Application Data

[62] Division of Ser. No. 174,903, Aug. 25, 1971, Pat. No. 3,801,715.

[52] U.S. Cl. .................. 99/474; 99/443 C; 99/477; 426/314
[51] Int. Cl.² ...................... A23B 7/06; A23L 3/16
[58] Field of Search...... 99/474, 518, 467, 473–475, 99/477, 443 C; 426/481, 482, 510, 520, 314

[56] References Cited
UNITED STATES PATENTS

| 887,628 | 5/1908 | Hall | 99/477 X |
|---|---|---|---|
| 2,373,521 | 4/1945 | Wigelsworth | 426/510 |
| 2,403,871 | 7/1946 | McBean | 99/467 X |
| 2,692,200 | 10/1954 | Olson | 99/477 X |
| 2,910,393 | 10/1959 | Magnuson et al. | 99/467 X |
| 3,086,444 | 4/1963 | DeBack | 99/467 X |
| 3,086,868 | 4/1963 | Keifer | 426/510 X |
| 3,581,652 | 6/1971 | Chauvin | 99/443 C X |

Primary Examiner—Peter Feldman
Assistant Examiner—Arthur O. Henderson
Attorney, Agent, or Firm—Naylor, Neal & Uilkema

[57] ABSTRACT

A continuous dry blanching process as a preliminary to freezing operation with vegetables such as spinach, green peas, carrots, green beans, etc., is provided. The process employs a recirculating substantially oxygen-free gaseous heating medium which is heated to a temperature above 212° F. and which is formed from the products of combustion and includes steam as a moisture medium. In the treating zone the medium provides a fluidized bed of the vegetable being blanched. The process and apparatus provides for a substantial saving in time in the blanching operation, it saves more of the product and its content as far as minerals, vitamins and nutrient constituents are concerned, and it produces no residue or substantially no residue which has to be passed into a stream or into the sewer system.

4 Claims, 3 Drawing Figures

DRY BLANCHING APPARATUS AND PROCESS

RELATED APPLICATION

This application is a division of my co-pending application, Ser. No. 174,903, filed Aug. 25, 1971, now U.S. Pat. No. 3,801,715.

DESCRIPTION OF THE INVENTION

The present invention relates to apparatus and process for blanching vegetables such as spinach, green peas, carrots, green beans, etc., as a preliminary to freezing of the vegetables, and it employs a constantly recirculating gaseous heating medium which is constantly regenerated as to its constituents by use of the products of combustion of a gas flame so as to be substantially oxygen-free to avoid oxidation of the vegetables being blanched and by the injection of steam.

The principle of circulating a treating medium through a closed path was first proposed in the patent to Magnuson and Smith U.S. Pat. No. 2,910,393 dated Oct. 27, 1959, and Magnuson U.S. Pat. No. 2,910,392 dated Oct. 27, 1959, wherein a peeling process is employed on fruit and vegetable articles such as tomatoes for example, and the tomatoes pass through a treating zone through which a circulating high temperature gaseous medium 800° F. and higher is passed at a high velocity (60 to 75 m.p.h.). This prior art medium was passed downwardly over the product so as to first cause the skin of the tomato to blister and then to lift the edges of the skin and to rip off or remove portions of the skin due to the velocity of the gaseous treating medium.

In the present invention another type of recirculating gaseous medium is provided for a different purpose and this circulating gaseous medium is essentially the products of combustion of the gas flame plus steam and is kept at an elevated temperature circulated to pass up through the treating zone so as to produce a fluidized bed of the product being treated in the treating atmosphere so that all surfaces will be contacted.

It is a general object of the invention therefor to provide an improved apparatus and method for the blanching of fresh vegetables.

Another object of the invention is to provide process and apparatus for the blanching of vegetables in which a recirculating treating atmosphere is composed of the products of combustion of a gaseous flame and injected steam to obtain and maintain a desired moisture content.

It is a further object of the invention to blanch the vegetables in a manner to raise the center temperature of the product to a high enough level to destroy the enzymes which cause spoilage.

Still another object of the invention is to provide a blanching process which will reduce the weight loss of the blanched product, and will provide a minimum of effluent for a given processing volume of product.

Still another object of the invention is to provide a blanching process which will retain an unusually high amount of the flavor, color and vitamin contents of the vegetables.

A still further object of the invention is to provide a blanching process in which the heating of the treating medium is substantially independent of the amount of steam injected.

Still another object of the invention is to provide a blanching process in which the rate of heat transfer is by velocity of the treating medium.

Still a further object of the invention is to provide a blanching process in which the moisture content is easily controlled so as to replace any moisture which tends to evaporate from the product being blanched.

The above and other objects are attained as described in the accompanying specification, made with reference to the attached drawings, in which.

Figure 1:
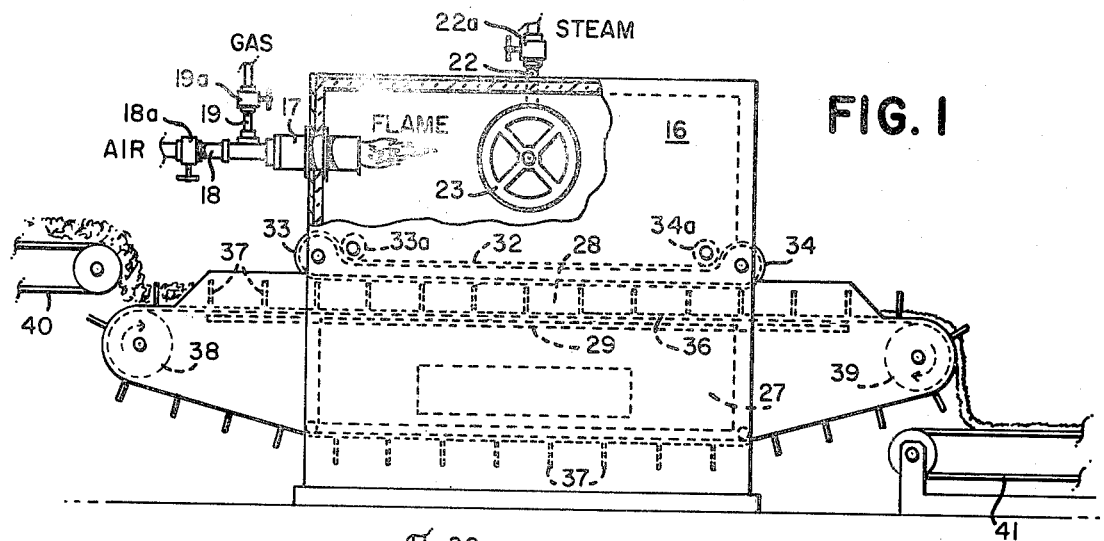
FIG. 1 is a side elevational view partially in section of the blanching apparatus.
Figure 2:
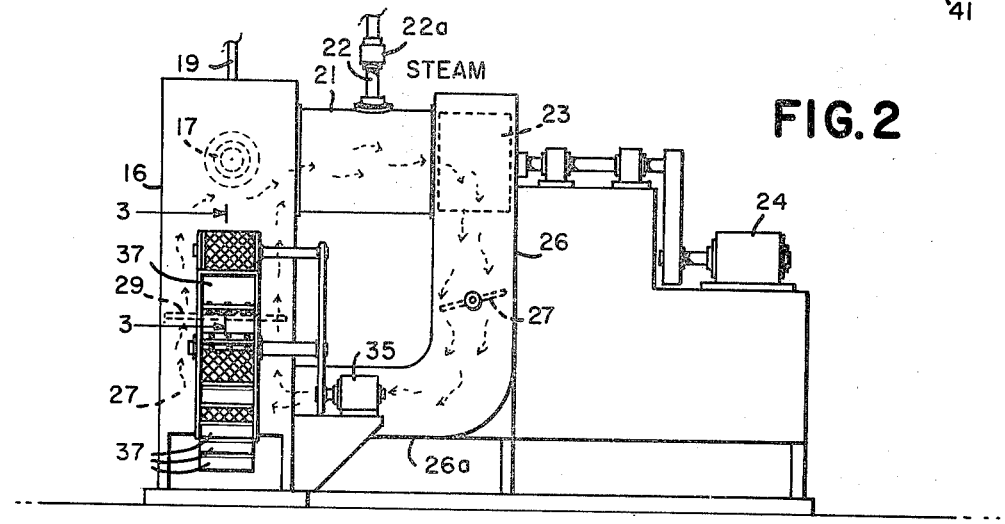
FIG. 2 is an end elevational view taken as viewed from the right in FIG. 1.
Figure 3:
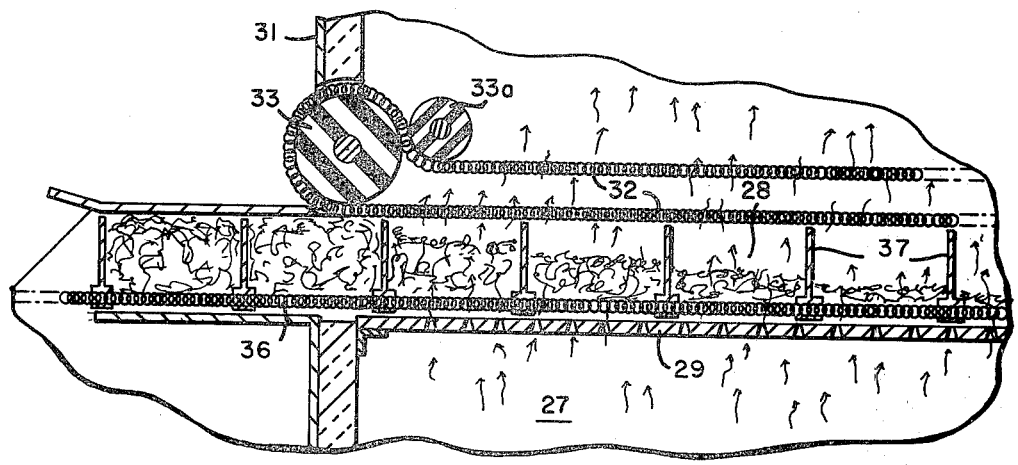
FIG. 3 is a fragmentary sectional view taken in the plane indicated by the line 3—3 in FIG. 2.

Referring to FIGS. 1, 2 and 3, the circulating hot gaseous treating medium is of substantially oxygen-free type and is produced by using the products of combustion from a gas burner into which steam is injected. As seen in FIGS. 1, 2 and 3, a combustion chamber 16 shown at the top end of which a gas burner 17 projects having an air conduit 18 and a fuel conduit 19 feeding the air and fuel thereto and controlled by respective valves 18a and 18b. The combustion products are withdrawn from the combustion chamber and passed through a conduit 21 for steam injection from a steam pipe 22 having a control valve 22a, and then into the top of a passage containing the blower 23 which is driven through suitable belting from a motor 24. A conduit 26 extends downwardly from the housing for blower 23 and has a damper or a butterfly valve 27 disposed therein to control the rate of flow. At the bottom the conduit 26 extends horizontally at 26a to a plenum chamber 27 which is disposed below the treating zone 28 comprising a narrow space between the apertured nozzle plate 29 and a conduit 31 leading upwardly to the combustion chamber 16.

The treating zone 28 has a mesh-type conveyor 32 at the top which keeps the product in, but permits the passage of the treating medium. The conveyor is trained over drums 33 and 34 which are mounted conventionally. The drum 34 is driven by a motor 35. A wire mesh conveyor 36 extends through the bottom of the treating zone and is carried by suitable drums 38 and 39. The conveyor 36 has suitable vertical partitions 37 carried therewith serving to compartment the vegetable articles on the treating zone so as to control the treatment of the articles. The upward flow of the gaseous medium from the plenum chamber 27 through the apertured pressure plate 29 and into the heating zone provides a fluidized bed of the articles being treated, for example, spinach, as shown in FIG. 3. By the time the spinach arrives at the discharge end of the treating zone it is reduced in volume from the full condition shown at the left of the treating chamber to a portion of reduced volume as shown at the right of the figure.

In the use of the apparatus for dry blanching of vegetables, the vegetables are prepared in the usual manner by removing any defective vegetables, washing, etc., and then are placed on the feed conveyor 40 which delivers the product into compartments formed by the partitions 37 and the belt 36. Prior to this time, the burner 17, of course, has been ignited and its flame adjusted by operation of valves 18a and 19a. The blower 23 has been started and an appropriate amount of steam is being injected through the steam pipe 22 under control of valve 22a to provide correct amount of moisture in the atmosphere so that it will not be drying as far as the product being handled is concerned. In this way the weight loss of the product being treated can be held to a minimum. The principal heat in the gaseous treating medium comes from the burner 17 so that the temperature of the gaseous heating medium is controlled easily. It should be remembered also that this recirculating gaseous heating medium has its temperature renewed each time during a traverse of the closed path and has its moisture renewed by the steam injected through the pipe 22.

As the product in the compartments on the conveyor 36 enters the treating zone it is subjected to the gaseous heating medium passing upwardly through it. As previously stated the vegetables and gaseous medium in each compartment form a fluidized bed where the vegetables are moved about so as to have their surfaces exposed constantly to the gaseous treating medium passing through the fluidized bed. This effectively heats every surface of the vegetables uniformly as they are agitated in turning over and about due to the action of the gaseous treating medium passing therethrough. At the same time a very effective rate of heat transfer occurs due to the velocity of the gaseous treating medium so that the blanching operation is effected in a short time.

Preferably, the gaseous treating medium has a temperature of 230° upward to about 270° depending upon the particular vegetable being processed and its velocity is adjusted to be adaptable to the type of product being processed so that a fluidized bed of the product is maintained and the product is not held against the conveyor belt 32 which closes the upper part of the treating zone to the passage of product. This traveling closure is disposed close to or in contact with the upper edges of the partitions 37 on the belt as it is traveling through the treating zone.

In actual operation of the apparatus on the vegetable, green peas, for example, the temperature was held between 250° and 255° F., and the conveyor speed was adjusted to provide a 2 minute travel of an article through the treating zone, a high enough velocity of gaseous treating medium was employed to obtain an effective fluidized bed, and this velocity may vary from vegetable to vegetable. In other run on green peas at a blanching temperature of 250° F. the treatment time used as about 3 to 3½ minutes on different tests. In all of these tests the peroxidase level in the blanched product was 0.058 or lower, thus indicating that the blanching was substantially complete. In blanching runs on spinach, carrots and green beans satisfactory results were also obtained.

The above apparatus is useful in treating vegetables such as spinach as described above, peas, carrots, green beans, etc., any products which require blanching as a part of processing. Preferably, the product discharged from the conveyor 36 onto the conveyor 41 as seen in FIG. 1, is conveyed to subsequent processing for freezing, canning, or other method of preservation.

While I have shown and described a preferred form of the invention, it will be apparent that the invention can be varied and modified from the form shown so that the scope thereof should be limited only by the proper scope of the claims appended hereto.

I claim:

1. In an apparatus for the dry blanching of vegetables, a combustion chamber, means forming a continuous substantially closed path including said combustion chamber for recirculation of a gaseous treating medium, a burner at said combustion chamber, conduit means for introducing air and fuel into the burner, means for introducing moisture into said path to mix into said medium, a plenum chamber formed at a lower part of said closed path, and a treating zone in said closed path immediately above said plenum chamber.

2. An apparatus, as recited in claim 1, wherein said means for introducing moisture comprises a steam injection pipe communicating with said path.

3. An apparatus, as recited in claim 1, wherein said treating zone comprises a pair of spaced apart apertured conveyors extending across said closed path for movement therethrough.

4. An apparatus, as recited in claim 1, further including an apertured valve plate at the top of said plenum chamber.

* * * * *